United States Patent [19]
Jillson

[11] Patent Number: 5,273,361
[45] Date of Patent: Dec. 28, 1993

[54] ZIP WRAP MAILERS

[75] Inventor: Ken Jillson, Laguna Beach, Calif.

[73] Assignee: Jillson & Roberts, Irvine, Calif.

[21] Appl. No.: 969,990

[22] Filed: Nov. 2, 1992

[51] Int. Cl.$^5$ .............................................. B65D 30/08
[52] U.S. Cl. ........................................ 383/93; 383/84; 383/109; 383/119
[58] Field of Search ................... 383/3, 84, 109, 110, 383/119; 229/80, 87.19, 922, 923; 206/522

[56] References Cited

U.S. PATENT DOCUMENTS

| | | | |
|---|---|---|---|
| 3,055,575 | 9/1962 | Gerard | 383/84 X |
| 3,349,990 | 10/1967 | Woodford | 383/107 X |
| 3,372,861 | 3/1968 | Johnson et al. | 229/80 |
| 3,592,380 | 7/1971 | Gerard | 383/84 X |
| 5,186,988 | 2/1993 | Dixon | 229/87.19 X |

FOREIGN PATENT DOCUMENTS

| | | | |
|---|---|---|---|
| 1029870 | 5/1966 | United Kingdom | 383/109 |
| 2186253 | 8/1987 | United Kingdom | 206/522 |

Primary Examiner—Stephen P. Garbe
Assistant Examiner—Jes F. Pascua
Attorney, Agent, or Firm—Blakely, Sokoloff, Taylor & Zafman

[57] ABSTRACT

A rugged mailing envelope which has a pattern or design printed on the outer surface of the envelope. The envelope is constructed from a clay coated paper which has a printed pattern on an outer surface and a layer of polyethylene on an inner surface. The polyethylene is typically 0.001 inches thick and contains a linear low density polyethylene. The thickness and mixture of polyethylene provides a coating which increases the strength and flexibility of the paper. Attached to the polyethylene is a sheet of bubble wrap adapted to protect any item placed within the envelope. The envelope has a single opening which can be sealed by an adhesive transfer tape that is normally covered with a strip of protective paper.

5 Claims, 1 Drawing Sheet

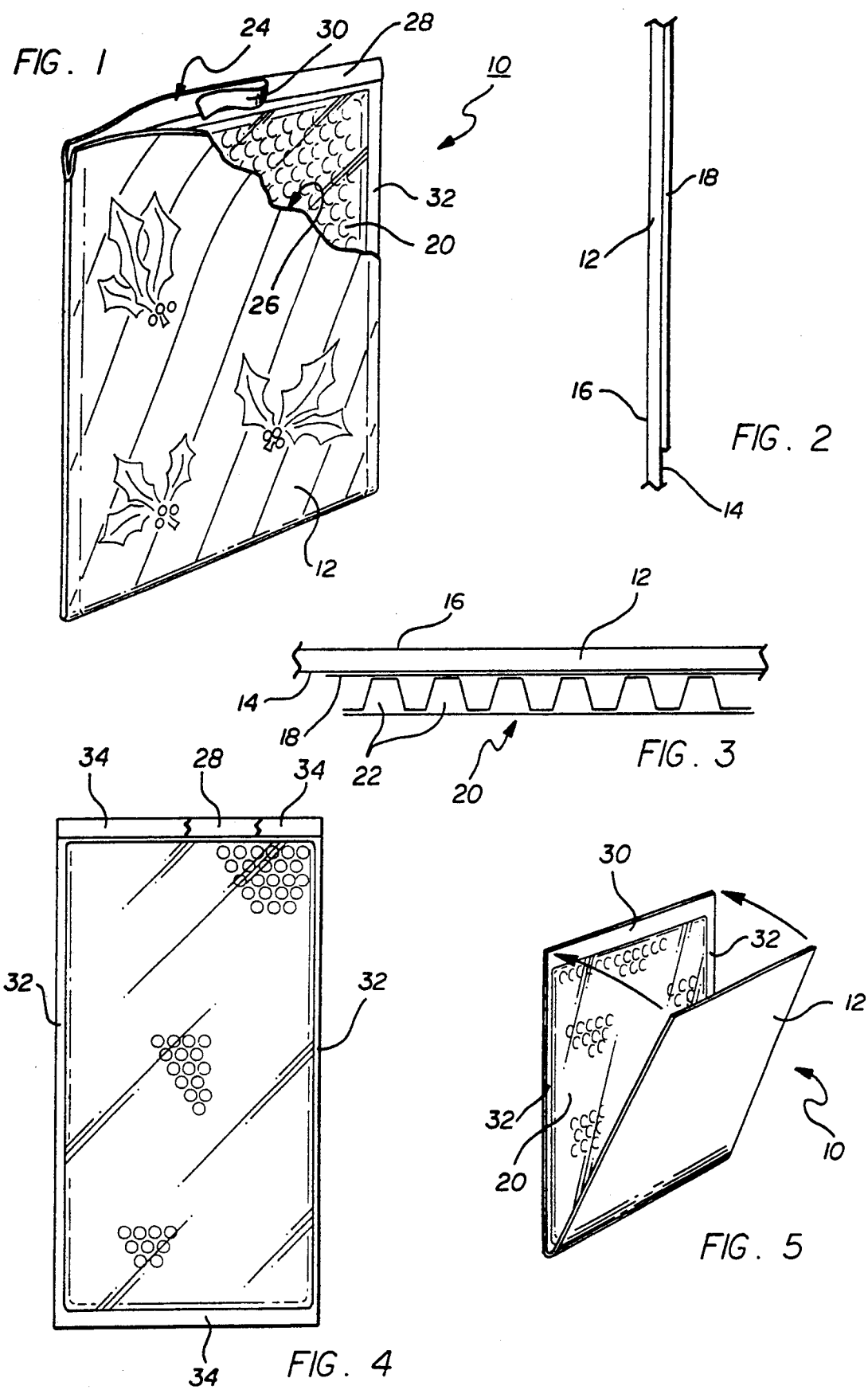

ZIP WRAP MAILERS

BACKGROUND OF THE INVENTION

1. Field of the Invention

The present invention relates to a mailing envelope.

2. Description of Related Art

When fragile items are shipped or mailed, the item is typically covered with paper, foam and/or a material which is commonly known as bubble wrap. The wrapped device is then placed in a box and shipped to the desired destination. For some items it is difficult to find a properly sized box. The packager may have to use an over-sized box, which requires the insertion of additional wrapping paper, foam, etc. Additionally, storing foam or other protective material is not always desirable or practical, especially when the packaging is done at a residence.

There has been developed an envelope which is lined with bubble wrapped and can be easily sealed for shipping. An item can be packaged by merely placing the object into the envelope, removing a protective sealing strip and pressing the ends of the envelope together to enclose the item. The envelope is typically constructed from a brown wrapping paper which is plain in appearance and susceptible to tearing. It would be desirable to provide a rugged sealable bubble wrapped envelope which has patterns, designs, pictures, etc, printed on the outer surface of the paper.

SUMMARY OF THE INVENTION

The present invention is a rugged mailing envelope which has a pattern or design printed on the outer surface of the envelope. The envelope is constructed from a clay coated paper which has a printed pattern on an outer surface and a layer of polyethylene on an inner surface. The polyethylene is typically 0.001 inches thick and contains a linear low density polyethylene. The thickness and mixture of polyethylene provides a coating which increases the strength and flexibility of the paper. Attached to the polyethylene is a sheet of bubble wrap adapted to protect any item placed within the envelope. The envelope has a single opening which can be sealed by an adhesive transfer tape that is normally covered with a strip of protective paper.

It is an object of the present invention to provide a rugged protective mailing envelope which has a pattern printed on the outer surface of the envelope.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a mailing envelope of the present invention;

FIG. 2 is a side view of a sheet of clay coated paper which is coated with a layer of polyethylene;

FIG. 3 is a side view of a sheet of bubble wrap attached to the layer of polyethylene;

FIG. 4 is a top view of the polyethylene coated paper with a strip of adhesive attached to the paper and a strip of protective paper covering the adhesive;

FIG. 5 is a perspective view of the paper being folded into an envelope.

DETAILED DESCRIPTION OF THE INVENTION

Referring to the drawings more particularly reference numbers, FIG. 1 shows a mailing envelope 10 of the present invention. The envelope 10 is constructed from a single sheet of clay coated paper 12 which has an inner surface 14 and an outer surface 16. The outer surface 16 is printed with a pattern or design. The clay coated paper provides an outer surface 16 which is very conducive to displaying and maintaining printed matter. Such a clay coated paper is presently sold under the trademark WESTPACO. In the preferred embodiment, the pattern is one that is typically found on gift wrap, wherein the envelope 10 can function as both a mailing package and wrapping paper for a gift. The present invention is particularly useful when mailing items during holidays such as Christmas. The envelope can be stored by a mailing service such as the United States Postal Service, which can provide and/or wrap gift items at the post office.

The inner surface 14 of the paper 12 is coated with a layer of polyethylene 18. In the preferred embodiment, the polyethylene 18 is approximately 0.001 inches thick and includes a mixture of 60% by volume of a normal density polyethylene and an 40% mixture of linear low density polyethylene which is produced by Astro-Valcor, Inc. under the tradename SPCHO. It has been found that this mixture of 0.001 inch thick polyethylene provides a coating that significantly increases the stiffness and flexibility of the paper, over paper in the prior art. The increased stiffness and flexibility of the paper decreases the envelope's susceptibility to puncturing and tearing.

Attached to the polyethylene 18 and inner surface 14 of the paper 12 is a bubble frame 20. The bubble frame 20 typically includes a plurality of sealed air filled cavities 22 encapsulated by two sheets of polyethylene. The bubble frame 20 is commonly known as bubble wrap. The air filled cavities absorb energy and protect the contents of the envelope from external loads.

The envelope 10 has an opening 24 which allows an item to be inserted into a pouch 26 formed by the paper 12. In the preferred embodiment, the envelope 10 has a strip of adhesive transfer tape 28 attached to one side of the paper adjacent to the opening 24. The opening 20 can be closed by pressing the paper onto the adhesive 28. A strip of protective paper 30 is normally placed over the adhesive 28, so that the envelope 10 is not inadvertently sealed. The envelope 10 is typically used by placing an item into the pouch 26, removing the protective strip 30 and pressing together the ends of the paper so that the adhesive 28 closes the opening 24. The item and envelope 10 are then ready for shipping.

FIGS. 2-5 show a preferred method of constructing the envelope 10. The outer surface 16 of the clay coated paper 12 is initially printed with a pattern or design. The entire inner surface 14 of the paper is then coated with a layer of 0.001 thick polyethylene 18, typically using an extrusion coating process. After the polyethylene hardens, the bubble wrap 20 is placed on top of the inner surface 16 of the paper 12. The bubble wrap 20 is typically cut smaller than the paper 12, so that there is defined a pair of side strips 32 and a pair of end strips 34 that are not covered by the bubble material 20.

The paper 12 is heated until the polyethylene 18 reaches a liquid or semi-liquid state. The envelope is then allowed to cool until the polyethylene hardens, such that the bubble wrap 20 is attached to the paper 12. The adhesive transfer tape 28 is applied to one end strip 34 of the paper and covered with the protective strip 30. The paper is then folded so that both the side strips 32 and end strips 34 are adjacent to each other. Heat is then applied to the side strip 32 to soften the polyethylene and subsequently bond the strips 32 together to form the envelope 10.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A mailing envelope, comprising:
    an envelope constructed from clay coated paper which has an inner surface and an outer surface, said envelope having an opening that provides access to a pouch;
    a layer of polyethylene covering said inner surface of said paper, said polyethylene including a mixture by volume of 60% normal density polyethylene and 40% linear low density polyethylene;
    a bubble frame attached to said inner surface of said paper, said bubble frame having a plurality of sealed encapsulated air cavities;
    fastening means for closing said opening of said envelope; and,
    a pattern printed on said outer surface of said paper.

2. The mailing envelope as recited in claim 1, wherein said polyethylene is approximately 0.001 inches thick.

3. The mailing envelope as recited in claim 1, wherein said fastening means includes an adhesive transfer tape that is covered by a strip of protective paper, said protective paper strip being constructed to be pulled away from said adhesive transfer tape.

4. A mailing envelope, comprising:
    an envelope constructed from clay coated paper which has an inner surface and an outer surface, said envelope having an opening that provides access to a pouch;
    a layer of polyethylene approximately 0.001 inches thick which covers said inner surface of said paper, said polyethylene having a mixture by volume of 60% normal density polyethylene and 40% linear low density polyethylene;
    a bubble frame attached to said inner surface of said paper, said bubble frame having a plurality of sealed encapsulated air cavities;
    a layer of adhesive transfer tape attached to of polyethylene adjacent to said envelope opening, said layer of adhesive being adapted to close said opening when said inner paper surface opposite said adhesive transfer tape is pressed into contact with said adhesive;
    a strip of protective paper covering said adhesive transfer tape, said protective paper strip being constructed to be pulled away from said adhesive transfer tape; and,
    a pattern printed on said outer surface of said paper.

5. A method of constructing a mailing envelope, comprising the steps of:
    a) providing a sheet of clay coated paper which has an inner surface and an outer surface;
    b) printing a pattern on said outer surface of said paper;
    c) coating said inner surface of said paper with a layer of polyethylene approximately 0.001 inches thick, said polyethylene including a mixture by volume of 60% normal density polyethylene and 40% linear low density polyethylene;
    d) placing a bubble frame onto said layer of polyethylene, said bubble frame being constructed to be smaller than said paper such that there is created a pair of side strips and a pair of end strips that are not covered with said bubble frame;
    e) heating said polyethylene;
    f) cooling said polyethylene such that said bubble frame is attached to said inner surface of said paper;
    g) attaching an adhesive transfer tape to one of said end strips;
    h) covering said adhesive transfer tape with a strip of protective paper;
    i) folding said paper such that said pair of side strips are adjacent to each other and said pair of end strips are adjacent to each other;
    j) heating said side strips; and,
    k) cooling said paper such that said side strips are attached.

* * * * *

UNITED STATES PATENT AND TRADEMARK OFFICE
CERTIFICATE OF CORRECTION

PATENT NO. : 5,273,361
DATED : December 28, 1993
INVENTOR(S) : Jillson

It is certified that error appears in the above-indentified patent and that said Letters Patent is hereby corrected as shown below:

Column 4, line 6, add --said layer--between "attached to' and "of polyethylene".

Signed and Sealed this

Twenty-eight Day of March, 1995

Attest:

BRUCE LEHMAN

Attesting Officer     Commissioner of Patents and Trademarks